(12) United States Patent  
Cadours et al.

(10) Patent No.: US 6,666,908 B2
(45) Date of Patent: Dec. 23, 2003

(54) PROCESS FOR DEACIDIZING A GAS WITH WASHING OF THE HYDROCARBONS DESORBED UPON REGENERATION OF THE SOLVENT

(75) Inventors: Renaud Cadours, Chatillon (FR); Fabrice Lecomte, Rueil Malmaison (FR); Pascal Mougin, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 93 days.

(21) Appl. No.: 10/057,895

(22) Filed: Jan. 29, 2002

(65) Prior Publication Data

US 2002/0104438 A1 Aug. 8, 2002

(30) Foreign Application Priority Data

Feb. 2, 2001 (FR) .............................. 01 01389

(51) Int. Cl.[7] .............................................. B01D 53/14
(52) U.S. Cl. ............................ 95/166; 95/177; 95/181; 95/183; 95/199; 95/235; 95/236; 423/228; 423/229; 423/242.7
(58) Field of Search .................... 95/235, 236, 181, 95/174, 166–199, 223, 183, 163; 423/228, 229, 242.7

(56) References Cited

U.S. PATENT DOCUMENTS

| | | | |
|---|---|---|---|
| 2,477,314 A | * | 7/1949 | Scharmann |
| 3,767,766 A | * | 10/1973 | Tjoa et al. |
| 3,989,811 A | * | 11/1976 | Hill |
| 4,242,108 A | * | 12/1980 | Nicholas et al. |
| 4,336,233 A | * | 6/1982 | Appl et al. |
| 4,367,258 A | * | 1/1983 | Lagana et al. |
| 4,412,977 A | * | 11/1983 | Fisch |
| 4,414,004 A | * | 11/1983 | Wagner et al. |
| 4,496,371 A | * | 1/1985 | Urban et al. |
| 4,997,630 A | * | 3/1991 | Wagner et al. |
| 4,999,031 A | * | 3/1991 | Gerhardt et al. |
| 5,085,675 A | * | 2/1992 | Kriebel et al. |
| 5,273,679 A | * | 12/1993 | Hihara et al. |
| 5,782,958 A | * | 7/1998 | Rojey et al. |
| 2002/0059865 A1 | * | 5/2002 | Lemaire et al. |
| 2002/0104438 A1 | * | 8/2002 | Cadours et al. |

FOREIGN PATENT DOCUMENTS

| | | | |
|---|---|---|---|
| EP | 0 021 479 | | 6/1979 |
| EP | 0 783 031 | | 7/1997 |
| FR | 2 600 554 | | 6/1986 |
| FR | 2 760 653 | | 3/1997 |
| FR | 2473083 | * | 7/1997 |

* cited by examiner

Primary Examiner—Duane S. Smith
(74) Attorney, Agent, or Firm—Antonelli, Terry, Stout & Kraus, LLP

(57) ABSTRACT

Within the scope of a process using two absorption sections for treating a natural gas containing $CO_2$ and/or $H_2S$, as well as mercaptans, COS and/or $CS_2$, the present invention aims to wash the gaseous hydrocarbons desorbed upon expansion of the solvent from the first absorption section with the solvent from the second absorption section.

14 Claims, 3 Drawing Sheets

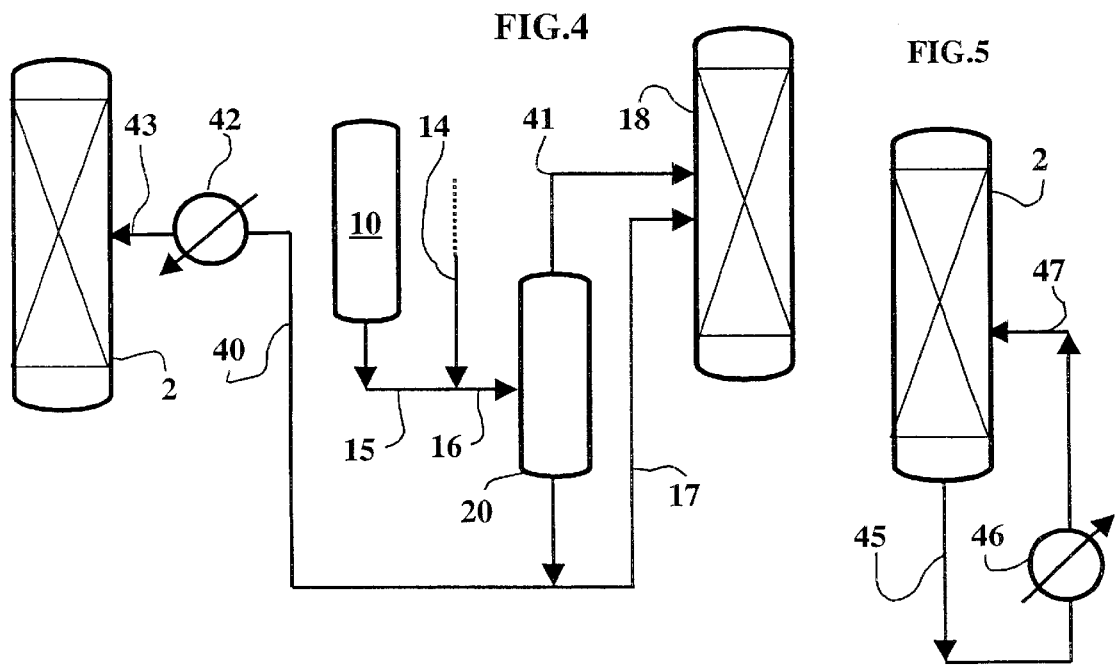
FIG.4
FIG.5
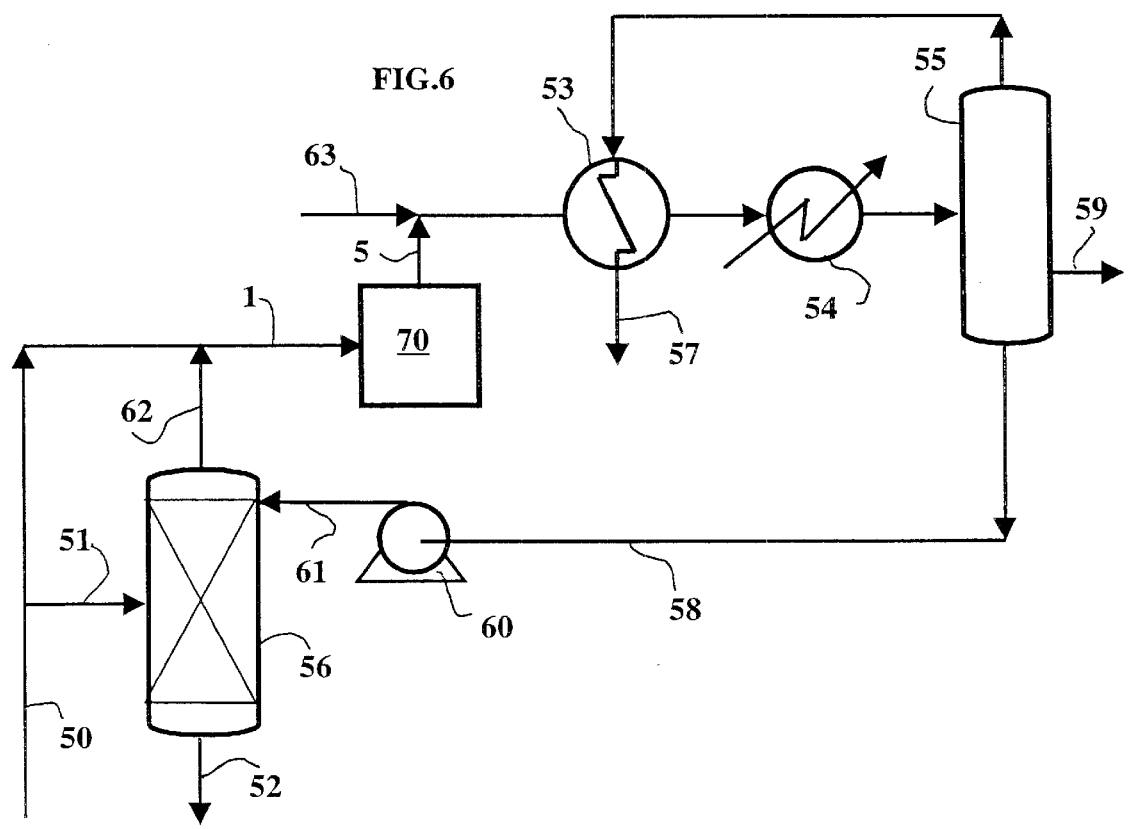
FIG.6

US 6,666,908 B2

PROCESS FOR DEACIDIZING A GAS WITH WASHING OF THE HYDROCARBONS DESORBED UPON REGENERATION OF THE SOLVENT

FIELD OF THE INVENTION

The invention relates to processes for deacidizing natural gas by contacting with a solvent in two successive sections so as to eliminate acid compounds such as carbon dioxide ($CO_2$) and/or hydrogen sulfide ($H_2S$), then sulfur compounds such as mercaptans, carbon oxysulfide (COS) and/or carbon disulfide ($CS_2$). The invention proposes a process for washing the hydrocarbons desorbed upon regeneration of the solvent.

BACKGROUND OF THE INVENTION

Patent FR-B-2,600,554 describes a technology suited for elimination of the sulfur compounds that pollute a natural gas already containing $CO_2$ and/or $H_2S$. The principle consists in using two absorption sections. In the first absorption section, the $CO_2$ and/or the $H_2S$ are collected by a totally regenerated solvent. The operating conditions in this section are determined so as to eliminate the major part of the $CO_2$ and/or of the $H_2S$. The gas thus obtained still contains sulfur compounds. It is then sent to a second absorption section wherein it is contacted with a solvent of the same nature as the solvent used in the first absorption section. This second section operates at a pressure that is similar to the pressure in the first absorption section, apart from the pressure drops, but at a lower temperature so as to favour absorption of the sulfur compounds.

Patent FR-B-2,600,554 proposes separate regeneration of the two solvent fractions coming from the two absorption sections. The solvent from the first absorption section is expanded so as to release the co-absorbed hydrocarbons and to eliminate a fraction of the acid gases absorbed. The solvent partly regenerated by expansion is then fed into a conventional regeneration column. The acid gases are desorbed and recovered at the top of the regeneration column. The perfectly regenerated solvent is then sent to a storage drum supplying both absorption sections. The solvent from the second absorption section is regenerated only by expansion, insofar as it essentially contains sulfur compounds. The solvent is advantageously heated prior to expansion. The regenerated solvent thus obtained is then sent to the storage drum supplying both absorption sections. The two gaseous fractions obtained upon expansion of the two solvent fractions from the two absorption sections are then mixed.

However, regeneration of the absorbent solution according to patent FR-B-2,600,554 involves drawbacks. In fact, upon expansion of the solvent coming from the first absorption section, an appreciable amount of acid compounds ($CO_2$ and $H_2S$) is released with the co-absorbed hydrocarbons. The gaseous effluent thus obtained is generally unusable because its acid compounds concentration exceeds the requirements imposed for a possible use as combustible gas, or possibly for marketing.

The aim of the present invention is to propose a treatment for freeing said gaseous effluent from acid compounds.

Since the $CO_2$ and/or the $H_2S$ present in the gaseous effluent are to be eliminated, the conventional processes, an example of which is given in patent EP-B-021,479, propose washing by contacting the gaseous effluent with a perfectly regenerated solvent fraction. This conventional configuration consequently leads to an increase in the global solvent flow rate and to an increase in the consumption of the utilities required for regeneration of the absorbent solution.

SUMMARY OF THE INVENTION

Within the scope of a process using two absorption sections for treating a natural gas containing $CO_2$ and/or $H_2S$, as well as mercaptans, COS and/or $CS_2$, the present invention aims to wash the gaseous hydrocarbons desorbed upon expansion of the solvent from the first absorption section with the solvent from the second absorption section.

The present invention relates to a process for deacidizing a natural gas containing acid compounds comprising at least compounds of the carbon dioxide and hydrogen sulfide group, and sulfur compounds comprising at least one of the compounds of the mercaptans, COS and $CS_2$ group, comprising the following stages:

a) contacting said natural gas with a regenerated solvent in a primary absorption section so as to produce a gas poor in acid compounds and a solvent containing acid compounds and hydrocarbons, b) contacting said gas poor in acid compounds with a regenerated solvent so as to produce a gas poor in acid compounds and in sulfur compounds and a solvent containing sulfur compounds, c) expanding at least a first fraction of said solvent containing acid compounds and hydrocarbons so as to produce a gaseous effluent containing hydrocarbons and acid compounds, and a solvent containing acid compounds and freed of hydrocarbons, d) contacting said gaseous effluent containing hydrocarbons and acid compounds with at least a first fraction of said solvent containing sulfur compounds so as to produce a gas containing hydrocarbons and sulfur compounds, and freed of acid compounds, as well as a solvent containing acid compounds.

The process according to the invention can also comprise at least one of stages e), f) or g):

e) distilling said solvent containing acid compounds and freed of hydrocarbons from stage c) and said solvent containing acid compounds from stage d) so as to obtain a gas containing acid compounds and a regenerated solvent that is recycled to at least one of stages a) and b), f) distilling in a distillation column said solvent containing acid compounds and freed of hydrocarbons from stage c) and said solvent containing acid compounds from stage d) so as to obtain a gas containing acid compounds and, at an intermediate level between the top and the bottom of said column, a regenerated solvent that is recycled to at least stage b), g) expanding said solvent containing acid compounds and freed of hydrocarbons from stage c) so as to produce a gas containing acid compounds and a solvent poor in acid compounds.

If the process according to the invention comprises stage g), it can also comprise stage h):

h) distilling in a distillation column at least a first fraction of said solvent poor in acid compounds from stage g) and said solvent containing acid compounds so as to produce a gas containing acid compounds and a regenerated solvent that is recycled to at least one of stages a) and b).

If the process according to the invention comprises stage h), it can also comprise stage i):

i) feeding said gas containing acid compounds from stage g) into said distillation column.

If the process according to the invention comprises stage i), it can also comprise stage j):

j) feeding a second fraction of said solvent poor in acid compounds from stage g) into said primary absorption section.

The process according to the invention can also comprise indiscriminately at least one of stages k), l), m) and n):

k) expanding a second fraction of said solvent containing sulfur compounds from stage d) so as to produce a gas and a regenerated solvent that is recycled to at least one of stages a) and b), l) cooling a second fraction of said solvent containing acid compounds and hydrocarbons from stage a), then feeding it again into said primary absorption section, m) prior to stage a), contacting at least a first fraction of said natural gas with a solution of methanol in water so as to produce a methanol-containing gaseous fraction, mixed with the remaining fraction of said natural gas, that is sent to stage a) with said natural gas, n) after stage b), cooling said gas poor in acid compounds and sulfur compounds so as to produce at least a solution of methanol in water that is recycled to stage m).

The solvent used in the process according to the present invention can notably consist of an aqueous solution comprising methanol and a mixture of amine and alkanolamine representing each 0% to 60% by weight of the solvent, or of an aqueous solution comprising sulfolane and a mixture of amine and alkanolamine representing each 0% to 60% by weight of the solvent.

The present invention allows to wash the gaseous effluent obtained by expansion of the solvent from the first absorption section with a stream of solvent that has been previously used by the process to absorb sulfur compounds. Thus, washing of gaseous effluents does not require an increase in the global flow rate of solvent used by the process.

BRIEF DESCRIPTION OF THE DRAWINGS

Other advantages and features of the invention will be clear from reading the description hereafter of an embodiment of the invention, illustrated by the accompanying drawings wherein:

FIG. 5 shows an improvement in the operation of the primary absorption column, FIG. 6 diagrammatically shows the integration of the process according to the invention in a dehydration, deacidizing and stripping process.

DETAILED DESCRIPTION

Figure 1:
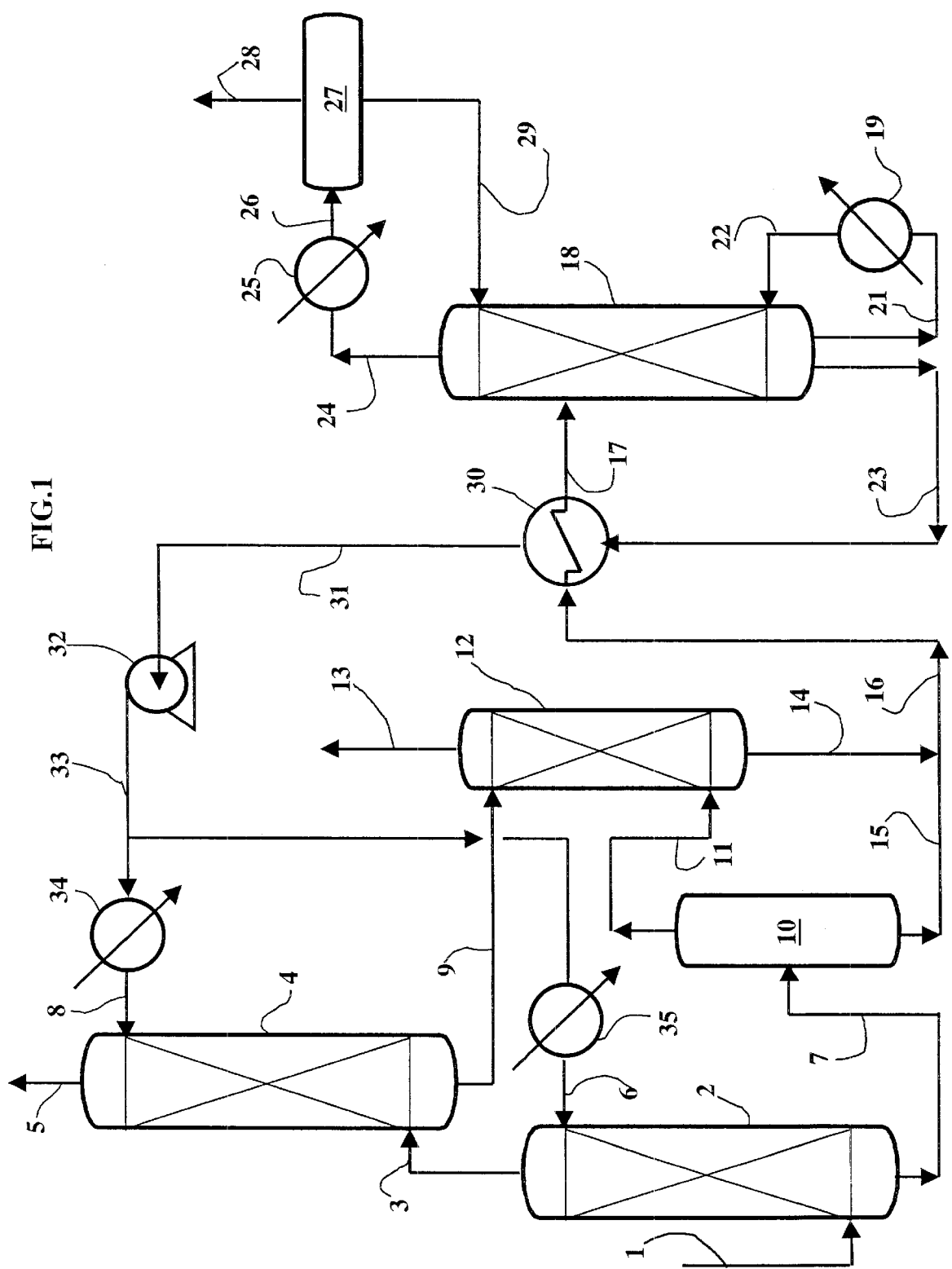
FIG. 1 diagrammatically shows the process according to the invention.

Any technique intended to favour absorption of $CO_2$ and/or of $H_2S$ in the primary absorption section will highlight the importance of the configuration of the process described by the invention. In fact, the increase in the amount of $CO_2$ and/or of $H_2S$ absorbed in the primary absorption section will lead to increase the efficiency of the secondary absorption section intended to eliminate the sulfur compounds of the gas that have not been absorbed in the primary absorption section. Such a technique will also lead to an increase in the $CO_2$ and/or $H_2S$ concentration in the gaseous effluent obtained by expansion of the solvent from the first absorption section, and will require implementation of the present invention.

The process described by the invention can be used for deacidizing a gas containing appreciable amounts of $CO_2$ and/or $H_2S$, for example up to 70% by mole, as well as a proportion of mercaptans, COS and/or $CS_2$ that can reach several percents by mole. The gas to be treated can be available at pressures ranging between 1 and 10 MPa. It can furthermore contain traces of methanol or of another organic solvent from a previous processing operation.

The invention described is applicable to solvents consisting of an aqueous solution of one or more basic compounds, notably an aqueous solution of one or more amines (primary, secondary or tertiary) or alkanolamines (primary, secondary or tertiary) having a significant steric hindrance or not. The solvent can also consist of a mixture of an aqueous solution of one or more basic compounds with one or more organic solvents. Examples thereof are sulfolane, polyethylene glycols, pure or in admixture, at a concentration that can reach 0 to 60% by weight. The solvent will then have a maximum amine or alkanolamine content of 60% by weight.

Physical type solvents such as solvents based on methanol, polyethylene glycol or N-methyl-2-pyrrolidone can also be used by the process of the present invention.

The conventional solvents used in processes such as, for example, those marketed under the following trade names: UCARSOL, FLEXORB, SULFINOL, PURISOL, IFPEXOL, RECTISOL, SELEXOL, MORPHYSORB and AMDEA, belong to the range of application of the invention.

Working on the principle that the privileged area of application is that of gas containing high amounts of acid gases, the solvent used in the invention is advantageously a mixture of methanol, water and a heavy compound with $CO_2$ and/or $H_2S$ physical or chemical absorption capacities. The heavy compound can be a polar solvent such as dimethylformamide (DMF), N-methylpyrrolidone (NMP) or dimethylsulfoxide (DMSO). The heavy compound can also be a chemical solvent such as a primary, secondary or tertiary amine or alkanolamine, or a mixture thereof. Examples thereof are monoethanolamine, diethanolamine, diisopropanolamine, diglycolamine and methyldiethanolaine. The solvent will have a methanol content ranging between 0 and 70% by weight, and an amine content ranging between 0 and 60% by weight; preferably less than 50% by weight of methanol and less then 40% amine. The solvent can contain, instead of amine, an alkanolamine content ranging between 0 and 60% by weight. The presence of methanol implies integration of the invention in a conventional technology as described in patent FR-B-2,743,083.

The process is described in detail hereafter in connection with the diagram of FIG. 1.

The gas to be treated, delivered through line 1, contains acid compounds and sulfur compounds. According to the unitary operations performed upstream from the deacidizing section, this gas can possibly contain methanol. It is fed into the bottom of primary absorption section 2 through line 1. It is contacted with a solvent introduced at the top of the column through line 6. The temperature of the solvent delivered through line 6 is controlled by means of heat exchanger 35. The operating conditions in section 2 (pressure, temperature and flow rate of the solvent) are defined so as to obtain a sufficient absorption of $CO_2$ and/or $H_2S$. The gas discharged from section 2 through line 3 is freed of the major part of the $CO_2$ and/or of the $H_2S$, but it still contains sulfur compounds, COS and/or $CS_2$. The solvent containing acid compounds, $CO_2$ and/or $H_2S$ is discharged from section 2 through line 7.

The gas is then sent through line 3 to secondary absorption section 4 where it is contacted with a solvent of the same nature as the solvent fed into primary absorption section 2. The temperature of the solvent introduced at the top of section 4 through line 8 is controlled by means of heat exchanger 34. The operating conditions in section 4 (pressure, temperature and flow rate of the solvent) are defined so as to absorb a sufficient amount of sulfur compounds to meet the requirements imposed for the treated gas. The gas discharged from section 4 through line 5 is freed of the acid compounds and the sulfur compounds. The solvent containing sulfur compounds is discharged from section 4 through line 9.

The operating pressures in sections 2 and 4 correspond, apart from the pressure drops, to the pressure of the gas in line 1. The temperatures of the solvents introduced through lines 6 and 8 can range between 20 and 70° C., and they depend on the dew-point temperature of the gas to be treated. The temperature of the solvent delivered through line 8 is equal to or slightly less than the temperature of the solvent delivered through line 6. The flow of solvent introduced into primary absorption section 2 is defined so as to absorb a sufficient amount of $CO_2$ and/or $H_2S$. The flow of solvent introduced into secondary absorption section 4 is determined so as to eliminate the residual sulfur compounds in the gas. This flow of solvent introduced into section 4 can have variable proportions and it can represent 20 to 100% of the flow of solvent introduced into primary absorption section 2.

The two absorption sections can have the form of two columns of different size, diameter and height, and they are provided with plates or with stacked or random packings. Each column is operated under countercurrent conditions. Both sections can advantageously be the two superposed zones of a single column, as explained in patent FR-B-2, 600,554.

The solvent introduced through line 7 is expanded in flash drum 10 to an intermediate pressure between the pressure of absorption sections 2 and 4 and the pressure of regeneration column 18. During this expansion, the hydrocarbons co-absorbed by this solvent in the primary absorption section desorb in form of a gaseous effluent. The hydrocarbon-containing gaseous effluent is discharged from drum 10 through line 11, while the hydrocarbon-depleted solvent is discharged from drum 10 through line 15. The gaseous effluent also contains an amount of $CO_2$ and/or $H_2S$ that depends on the initial composition of the gas to be treated 1 and on the operating conditions in section 2. The gaseous effluent introduced through line 11 into washing column 12 is brought into countercurrent contact with the solvent delivered through line 9. In washing column 12, as a result of the acid-basic competitiveness between the various acid compounds ($CO_2$ and/or $H_2S$) and sulfur compounds (mercaptans, COS and/or $CS_2$), the sulfur compounds mainly physically absorbed by the solvent are desorbed and discharged at the top of column 12 with the gaseous effluent through line 13, while the acid compounds contained in the gaseous effluent are absorbed by the solvent discharged at the bottom of column 12 through line 14.

The washing column can comprise plates, stacked or random packings. The temperature of the solvent fed into the washing column can range between 40 and 80° C.

The two solvent fractions containing acid compounds and introduced through lines 14 and 15 are mixed together, then fed into regeneration column 18 through successive lines 16 and 17. This regeneration column consists of a distillation column wherein the acid compounds are stripped by the vapours of the solvent which is kept boiling by means of heating element 19. A solvent fraction discharged from the bottom of column 18 through line 21 is sent to heating element 19, then reintroduced into the bottom of column 18 through line 22. The solvent vapours are discharged at the top of column 18 through line 24, then condensed in a heat exchanger 25. The condensate is sent through line 26 to separating drum 27. The liquid fraction obtained at the bottom of separating drum 27 is refluxed through line 29 to column 18, while the gas discharged from the top of separating drum 27 through line 28 essentially contains acid compounds, $CO_2$ and/or $H_2S$. The solvent regenerated at the bottom of the column, freed from the acid compounds, is discharged through line 23.

The operating pressure of regeneration column 18 generally ranges between 0.2 and 1 MPa. The column bottom temperature can be maintained between 100 and 150° C., which leads to a temperature ranging between 80 and 120° C. at the top of the column. The temperature of the condensate at the outlet of exchanger 25 generally ranges between 20 and −30° C.

The regenerated solvent obtained at the bottom of column 18 is freed of the $CO_2$ and $H_2S$ acid compounds. It is then sent back to primary and secondary absorption sections 2 and 4 by means of successive lines 23 and 31, then of pump 32 and finally of line 33 supplying heat exchangers 34 and 35. The solvent to be regenerated, delivered through line 16, can be preheated by the regenerated solvent delivered through line 23 in heat exchanger 30 by indirect heating. Exchanger 30 is preferably arranged, on the one hand, between lines 16 and 17, and on the other hand between lines 23 and 31.

Figure 2:
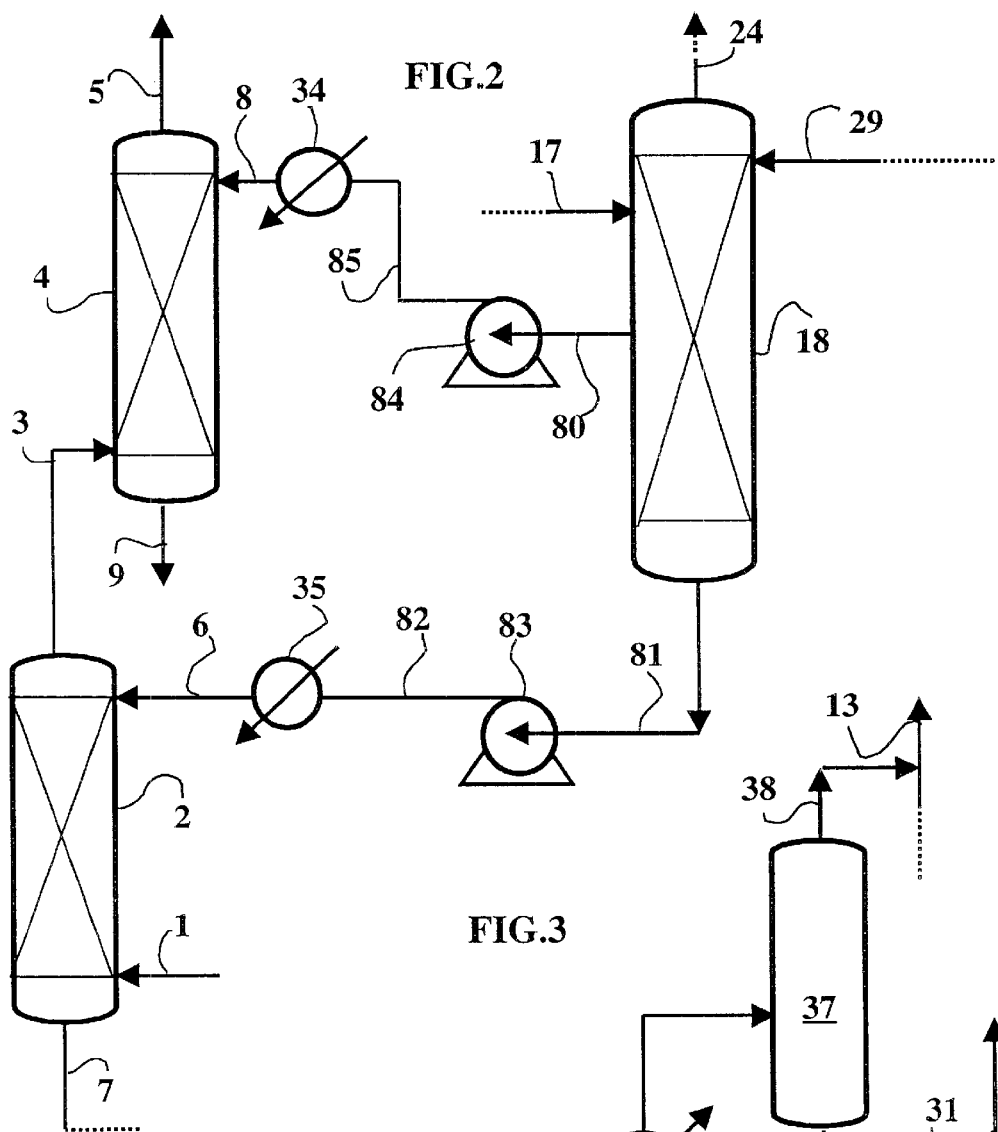
FIG. 2 diagrammatically shows a variant of the regenerated solvent delivery process.

FIG. 2 shows another mode of supplying the regenerated solvent from column 18 to absorption sections 2 and 4. The process described in connection with FIG. 2 takes up certain elements of the process of FIG. 1 and it is integrated therein. At the bottom of column 18, a regenerated solvent fraction is discharged and fed into primary absorption section 2 successively through line 81, pump 83, line 82 of heat exchanger 35 and line 6. At an intermediate level between the bottom and the top of regeneration column 18, where suitable thermodynamic conditions prevail, a regenerated solvent fraction is discharged through line 80. This solvent fraction is sent through line 80 to pump 84, through line 85, then to heat exchanger 34 and fed through line 8 into secondary absorption section 4. Discharge at an intermediate level of regeneration column 18 allows to obtain a solvent whose composition is different from that of the solvent discharged at the bottom of column 18. This discharge notably allows to obtain a regenerated solvent with a higher concentration in compounds, such as methanol and/or sulfolane for example, whose physical absorption capacity is more suited to absorb sulfur compounds than acid compounds. Thus, the solvent discharged at an intermediate level is advantageously contacted in the secondary absorption section with the gas coming from line 3 so as to absorb the sulfur compounds contained therein. The composition of the solvent discharged through line 80 depends on the composition of the solvent used by the process and on the thermodynamic conditions established in column 18 in the vicinity of the discharge point. The location of the discharge level is selected so as to obtain a regenerated solvent having the desired absorption characteristics.

Without departing from the scope of the invention, it is possible to combine the modes of delivery of the regenerated solvent from regeneration column 18 to primary and secondary absorption sections 2 and 4. On the one hand, the regenerated solvent can be discharged at one or more levels of column 18 so as to be sent, on the other hand, to primary absorption section 2 and/or to secondary absorption section 4.

Figure 3:
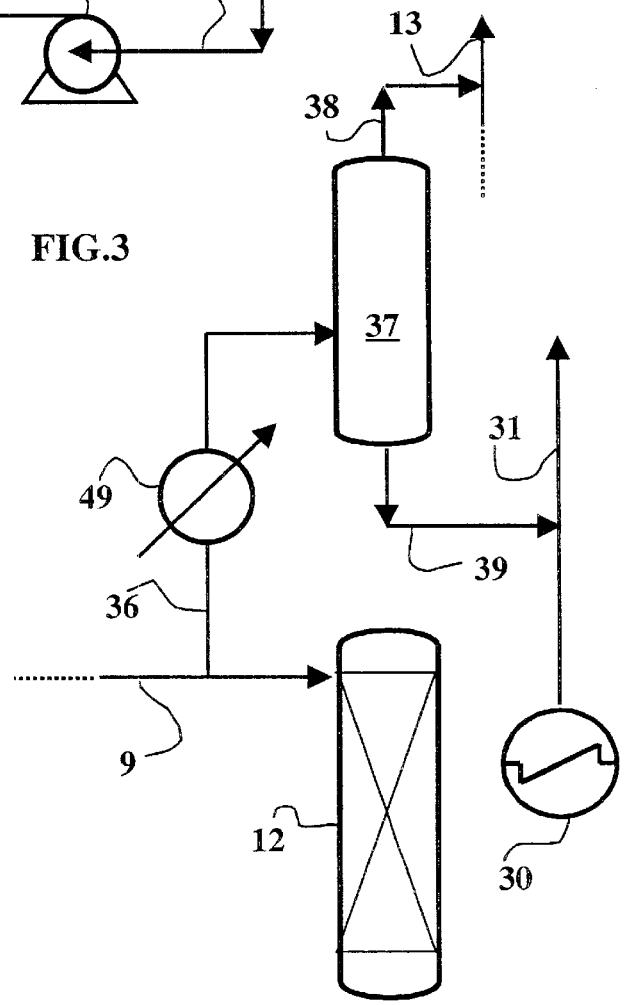
FIG. 3 shows a variant of the regeneration process, FIG. 4 describes a double expansion regeneration included in the process according to the invention.

According to the proportion of acid compounds and of sulfur compounds in the gas to be treated, and according to the operating conditions in the absorption sections, it may be unnecessary to use all of the solvent flow circulating in line 9 to wash the gaseous effluent in absorption column 12. The process, diagrammatically shown in FIG. 3 and integrated in the process shown in FIG. 1, is aimed to regenerate part of the solvent circulating in line 9 by simple expansion. A fraction of the solvent circulating in line 9 is discharged through line 36, heated in a heat exchanger 49, then sent to flash drum 37. The temperature and pressure conditions of flash drum 37 are adjusted so as to desorb only the sulfur compounds and the hydrocarbons carried along by the solvent upon contacting in secondary absorption section 4. The desorbed sulfur compounds and hydrocarbons are discharged from drum 37 through line 38 and combined with the gas coming from washing column 12 through line 13 so as to be used as combustible gas. The regenerated solvent discharged at the bottom of drum 37 through line 39 is mixed with the regenerated solvent from exchanger 30 circulating in line 31.

In order to absorb almost all of the $CO_2$ and/or of the $H_2S$ in the primary absorption section, it is advantageous to use several expansion levels for the solvent from the primary absorption section. Thus, according to the process shown in FIG. 4, integrated in the process of FIG. 1, the combination of the solvent coming from flash drum 10 through line 15 and of the solvent coming from washing column 12 through line 14 is sent through line 16 into flash drum 20 to be expanded to an intermediate pressure between the pressure of flash drum 10 and the pressure of regeneration column 18. The gas obtained at the top of flash drum 20 has a high acid compounds content. If the solvent used contains methanol, the gas obtained at the top of flash drum 20 can also contain methanol. This gas is sent through line 41 to the upper zone of regeneration column 18 at a delivery level situated above the delivery level of line 17. The solvent collected at the bottom of this drum 20 is partly regenerated. A fraction of this solvent is sent back through line 40 to a heat exchanger 42 to regulate its temperature, then fed through line 43 into the primary absorption section at an intermediate level between the bottom and the top. The rest of the solvent collected at the bottom of drum 20 through line 17 is sent to the regeneration column.

Furthermore, it is possible to increase the amount of $CO_2$ and/or of $H_2S$ absorbed in primary absorption section 2 by controlling the temperature in the lower part of the column. This can be achieved by means of a particular design of section 2, allowing regulation of the temperature by indirect cooling of said lower part by means of a cooling fluid. Considering the temperature levels at the bottom of primary absorption section 2, a cooling circuit allowing recirculation of a fraction of the solvent is advantageously used. With reference to FIG. 5, a solvent fraction discharged at the bottom of section 2 through line 45 is cooled by heat exchanger 46, then it is sent back into primary absorption section 2 through line 47 at an intermediate level between the top and the bottom. Cooling of the solvent allows to obtain a higher absorption capacity and it simultaneously allows to decrease the operating temperature at the bottom of the section, hence an increase in the amount of acid compounds absorbed.

The natural gas deacidizing process described in FIG. 1 can be included in the process described in patent FR-B-2, 743,083 in order to add the dehydration and stripping functions thereto. This patent proposes, prior to the deacidizing stage, contacting of the gas to be treated with a methanol solution so as to recover the methanol. This patent also proposes, after the dehydration stage, cooling of the gas, then separation in a drum of a light and gaseous hydrocarbon effluent, of the heavier hydrocarbons in liquid form and of an aqueous methanol solution that is recycled to the process.

FIG. 6 shows an example of integration of the deacidizing process according to the present invention into the process described in patent FR-B-2,743,083. Symbol 70 represents the process illustrated in FIG. 1. Lines 1 and 5, respectively leading to and coming out of symbol 70, correspond to lines 1 and 5 of FIG. 1.

The gas to be treated flows in through line 50. A fraction of this gas is sent through line 51 into contactor 56 where it is brought into countercurrent contact with a solution of methanol in water supplied through line 61. At the bottom of contactor 56, an aqueous phase substantially freed of methanol is discharged through line 52. At the top of contactor 56, a methanol-containing gas is recovered through line 62 and mixed with the gas fraction remaining in line 50 after discharge through line 51. This gas mixture is then sent through line 1 to the process according to the present invention represented by symbol 70.

The deacidized gas coming from the process according to the invention through line 5 receives makeup methanol delivered through line 63. It is then cooled, first by heat exchanger 53, then by heat exchanger 54. Heat exchanger 54 works with a cooling fluid coming from an external circuit. Cooling of the gas causes condensation of the heavy hydrocarbons and condensation of a solution of methanol in water, but the light hydrocarbons remain in the gaseous form. The three-phase mixture obtained is separated in drum 55. The dehydrated and deacidized light hydrocarbon gas is used as cooling fluid in heat exchanger 53, then it is discharged through line 57. The heavy hydrocarbons are discharged through line 59. The solution of methanol in water is discharged at the bottom of drum 55 through line 58 and recycled by pump 60 to the top of contactor 56 by means of line 61.

The following example illustrates the importance of the present invention.

Consider a natural gas with a high acid gas content comprising, expressed in moles, 4% $CO_2$, 21% $H_2S$, 55% methane, 11% ethane, the rest consisting of heavier hydrocarbons. This gas also contains 300 ppm methylmercaptan and ethylmercaptan.

At a flow rate of 100,000 $Nm^3/h$, this gas is first contacted with an aqueous methanol solution in order to recover the methanol it contains. The methanol-containing gas is then sent to primary absorption section 2. The gas is treated by countercurrent contact, at 45° C. and at an absolute pressure of 7.5 MPa, with 300 $m^3/h$ solvent at 50° C., this solvent being a mixture of methanol water and diethanolamine. In this primary absorption section 2, almost all of the $CO_2$ and $H_2S$ is absorbed by the solvent, as well as 60% of the mercaptans.

In secondary absorption section 4, the gas is contacted with 150 m³/h solvent at a temperature of 45° C. The remaining amounts of $CO_2$ and of $H_2S$ are fixed, as well as almost all of the mercaptans still present in the gas. The gas obtained at the outlet of this secondary absorption section 4 contains less than 5 ppm $H_2S$, less than 100 ppm $CO_2$ and less than 50 ppm mercaptans, mainly consisting of ethylmercaptan.

The gas thus obtained is then cooled in heat exchangers 53 and 54 in order to meet the transport requirements in terms of condensable hydrocarbons and water content. A gas free of acid compounds, a liquid hydrocarbon phase and a methanol-containing aqueous phase, which is recycled to contactor 56 at the beginning of the process, are thus obtained in drum 55.

The solvent coming from primary absorption section 2 is expanded in a drum 10 to 2.5 MPa. During this expansion, the hydrocarbons and the mercaptans carried along by the solvent are released, as well as an appreciable fraction of acid gases. This gaseous effluent is brought into countercurrent contact in washing column 12 with 10% of the solvent coming from secondary absorption section 4. The gas obtained essentially consists of hydrocarbons and contains less than 0.2% by mole of $H_2S$. Almost all of the mercaptans is present in the gas. The solvent coming from this washing column 12 is sent to a flash drum 20.

The solvent coming from this flash drum 20 is then conventionally regenerated in a regeneration column 18 working at 120° C. at the column bottom. 25000 Nm³/h acid gases containing 16% by mole of $CO_2$ and 84% by mole of $H_2S$ are obtained at the top of the column.

The solvent coming from secondary absorption section 4, apart from the 10% sent to washing column 12 intended to wash the gas coming from flash drum 10, is heated in exchanger 49 and expanded in drum 37. Heating can be carried out by using a fraction of the regenerated solvent obtained at high temperature at the bottom of the regeneration column. The mercaptans and the hydrocarbons fixed in secondary absorption section 4 are released. The gas obtained is mixed with the gas coming from washing column 12 to be used as combustible gas. The solvent obtained is mixed with the regenerated solvent from regeneration column 18.

What is claimed is:

1. A process for deacidizing a natural gas containing acid compounds comprising at least compounds of the carbon dioxide and hydrogen sulfide group, and sulfur compounds comprising at least one of the compounds of the mercaptan, COS and $CS_2$ group, comprising the following stages:
   a) contacting said natural gas with a regenerated solvent in a primary absorption section so as to produce a gas poor in acid compounds and a solvent containing acid compounds and hydrocarbons,
   b) contacting said gas poor in acid compounds with a regenerated solvent so as to produce a gas poor in acid compounds and in sulfur compounds and a solvent containing sulfur compounds,
   c) expanding at least a first fraction of said solvent containing acid compounds and hydrocarbons so as to produce a gaseous effluent containing hydrocarbons and acid compounds, and a solvent containing acid compounds and freed of hydrocarbons,
   d) contacting said gaseous effluent containing hydrocarbons and acid compounds with at least a first fraction of said solvent containing sulfur compounds so as to produce a gas containing hydrocarbons and sulfur compounds, and freed of acid compounds, as well as a solvent containing acid compounds.

2. A process as claimed in claim 1, comprising:
   e) distilling said solvent containing acid compounds and freed of hydrocarbons from stage c) and said solvent containing acid compounds from stage d) so as to obtain a gas containing acid compounds and a regenerated solvent that is recycled to at least one of stages a) and b).

3. A process as claimed in claim 1, comprising:
   f) distilling in a distillation column said solvent containing acid compounds and freed of hydrocarbons from stage c) and said solvent containing acid compounds from stage d) so as to obtain a gas containing acid compounds and, at an intermediate level between the top and the bottom of said column, a regenerated solvent that is recycled to at least stage b).

4. A process as claimed in claim 1, comprising:
   g) expanding said solvent containing acid compounds and freed of hydrocarbons from stage c) so as to produce a gas containing acid compounds and a solvent poor in acid compounds.

5. A process as claimed in claim 4, comprising:
   h) distilling in a distillation column at least a first fraction of said solvent poor in acid compounds from stage g) and said solvent containing acid compounds so as to produce a gas containing acid compounds and a regenerated solvent that is recycled to at least one of stages a) and b).

6. A process as claimed in claim 5, comprising:
   i) feeding said gas containing acid compounds from stage g) into said distillation column.

7. A process as claimed in claim 4, comprising:
   j) feeding a second fraction of said solvent poor in acid compounds from stage g) into said primary absorption section.

8. A process as claimed in claim 1, comprising:
   k) expanding a second fraction of said solvent containing sulfur compounds from stage d) so as to produce a gas and a regenerated solvent that is recycled to at least one of stages a) and b).

9. A process as claimed in claim 1, comprising:
   l) cooling a second fraction of said solvent containing acid compounds and hydrocarbons from stage a), then feeding it again into said primary absorption section.

10. A process as claimed in claim 1, comprising:
    m) prior to stage a), contacting at least a first fraction of said natural gas with a solution of methanol in water so as to produce a methanol-containing gaseous fraction, mixed with the remaining fraction of said natural gas, that is sent to stage a) with said natural gas,
    n) after stage b), cooling said gas poor in acid compounds and sulfur compounds so as to produce at least a solution of methanol in water that is recycled to stage m).

11. A process as claimed in claim 1, wherein the solvent consists of an aqueous solution comprising methanol and a mixture of amine and alkanolamine.

12. A process as claimed in claim 11, wherein the methanol, the amine and the alkanolamine represent each 0% to 60% by weight of the solvent.

13. A process as claimed in claim 1, wherein the solvent consists of an aqueous solution comprising sulfolane and a mixture of amine and alkanolamine.

14. A process as claimed in claim 13, wherein the sulfolane, the amine and the alkanolamine represent each 0% to 60% by weight of the solvent.

* * * * *